(12) United States Patent
Havens et al.

(10) Patent No.: US 7,585,544 B2
(45) Date of Patent: Sep. 8, 2009

(54) FLOW-THROUGH DIP-SPIN COATING METHOD AND SYSTEM THEREFOR

(75) Inventors: Rodney Havens, Marcellus, MI (US);
Timothy Hanna, Portage, MI (US);
Bradley Hanna, Portage, MI (US);
Christopher Jones, Paw Paw, MI (US)

(73) Assignee: Envirodyne Technologies, Inc., Kalamazoo, MI (US)

( * ) Notice: Subject to any disclaimer, the term of this patent is extended or adjusted under 35 U.S.C. 154(b) by 680 days.

(21) Appl. No.: 11/299,461

(22) Filed: Dec. 12, 2005

(65) Prior Publication Data

US 2007/0134412 A1    Jun. 14, 2007

(51) Int. Cl.
*B05D 1/18* (2006.01)
*B05D 3/12* (2006.01)

(52) U.S. Cl. ............... 427/240; 427/430.1; 427/435; 427/443.2

(58) Field of Classification Search ............ 427/240, 427/430.1, 435, 443.2
See application file for complete search history.

(56) References Cited

U.S. PATENT DOCUMENTS

| | | | | | |
|---|---|---|---|---|---|
| 3,310,027 | A | * | 3/1967 | Lindemann | 118/52 |
| 3,382,844 | A | * | 5/1968 | Kumpf | 118/58 |
| 3,699,918 | A | * | 10/1972 | Garrison | 118/54 |
| 4,170,191 | A | * | 10/1979 | Juve | 118/705 |
| 4,325,320 | A | * | 4/1982 | Kirisawa | 118/52 |
| 4,710,410 | A | * | 12/1987 | Narusch, Jr. | 427/430.1 |

* cited by examiner

*Primary Examiner*—Kirsten C Jolley
(74) *Attorney, Agent, or Firm*—Flynn, Thiel, Boutell & Tanis, P.C.

(57) ABSTRACT

A process and system for continuous flow-through dip-coating of a workpiece requires the introduction of the workpiece in a porous coating basket at a first side of a coating chamber and the removal of the coated workpiece in the coating basket from a second side of the coating compartment different from the first side. This enables the commingling of coated and uncoated workpieces to be avoided and allows for a higher throughput in the coating process.

13 Claims, 7 Drawing Sheets

FLOW-THROUGH DIP-SPIN COATING METHOD AND SYSTEM THEREFOR

BACKGROUND OF THE INVENTION

1. Field of the Invention

The present invention relates to a flow-through dip-spin coating process and system for applying a coating onto a workpiece.

2. Description of the Prior Art

Coatings are typically applied to workpieces in order to give the workpiece a desired property such as improved corrosion resistance, an improved appearance, improved lubricating properties and/or improved adhesive properties. Since coatings are less expensive than going to an upgrade of material like stainless steel from a basic carbon steel, coating processes have become very popular in the industry.

One method of applying a coating that is very popular is known as dip-spin coating. In this type of process, a mesh or porous basket filled with workpieces, such as fasteners, clamps, springs, O-rings, U-bolts, nails and screws, is immersed in a coating solution for a desired period of time. The basket is then removed from the coating solution and spun to eliminate excess coating solution by centrifugal force. The coated workpieces are then removed from the basket and sent to a curing stage where the coatings are hardened on the workpieces.

Dip-spin processes are most advantageous for small parts which can be coated in bulk and achieves precise, highly repeatable results, with transfer efficiencies as high as 98%. Additionally, dip-spin processes solve many environmental problems and allow many different types of coatings to be applied in an efficient and cost effective manner.

Conventional dip-spin coating processes have problems in that it is easy to get the coated and uncoated workpieces confused since the coated workpieces exit from the coating booth from the same side in which they entered as uncoated workpieces. Additionally, due to the care necessary to avoid the commingling of the coated and uncoated workpieces, the throughput of the coating process is not as fast as desired in that it is difficult to operate as a continuous process.

SUMMARY OF THE INVENTION

Through extensive research to find a dip-coating process and system which avoids the problems outlined above, the present inventors have discovered the present invention. That is, the present invention has as an object to provide a dip-spin coating process and system in which commingling of coated workpieces with uncoated workpieces is avoided.

The present invention has as another object to provide a dip-spin coating process which has a high throughput and can be operated in a continuous fashion.

These and other objects are achieved by providing a dip-spin coating process in which the uncoated workpieces enter a coating chamber in a basket through a first side and, after a dip-spin coating step, exit the coating chamber in the basket through a second side of the coating chamber different from the first side. The coated parts can be removed from the basket at a location which is remote from the location at which the uncoated parts are loaded into the basket and since the uncoated parts enter through a first side of the coating chamber and the coated parts exit from a second side of the coating chamber different from the first side, continuous operation of the dip-spin coating process is possible.

DETAILED DESCRIPTION

Figure 1:
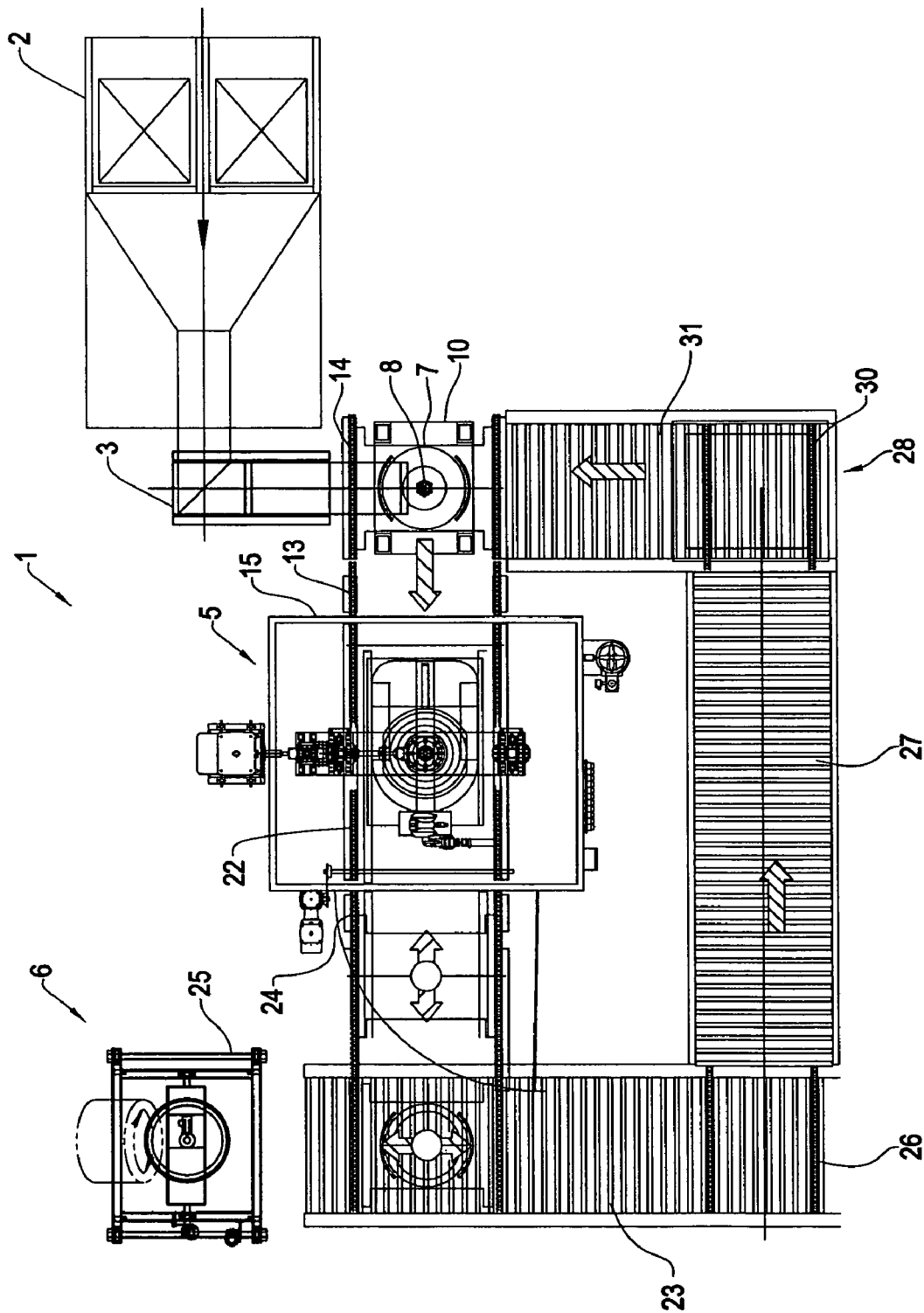
FIG. 1 illustrates a top view of the dip-spin coating process of the present invention.

FIG. 1 is a plan view of the dip-spin coating system 1 of the present invention. A bin loader 2 takes uncoated workpieces 8 and delivers them into a porous coating basket 7 supported on a pallet 10. The workpieces can be metallic, ceramic or plastic parts such as fasteners, clamps, springs, O-rings, U-bolts, nails and screws.

Figure 4:
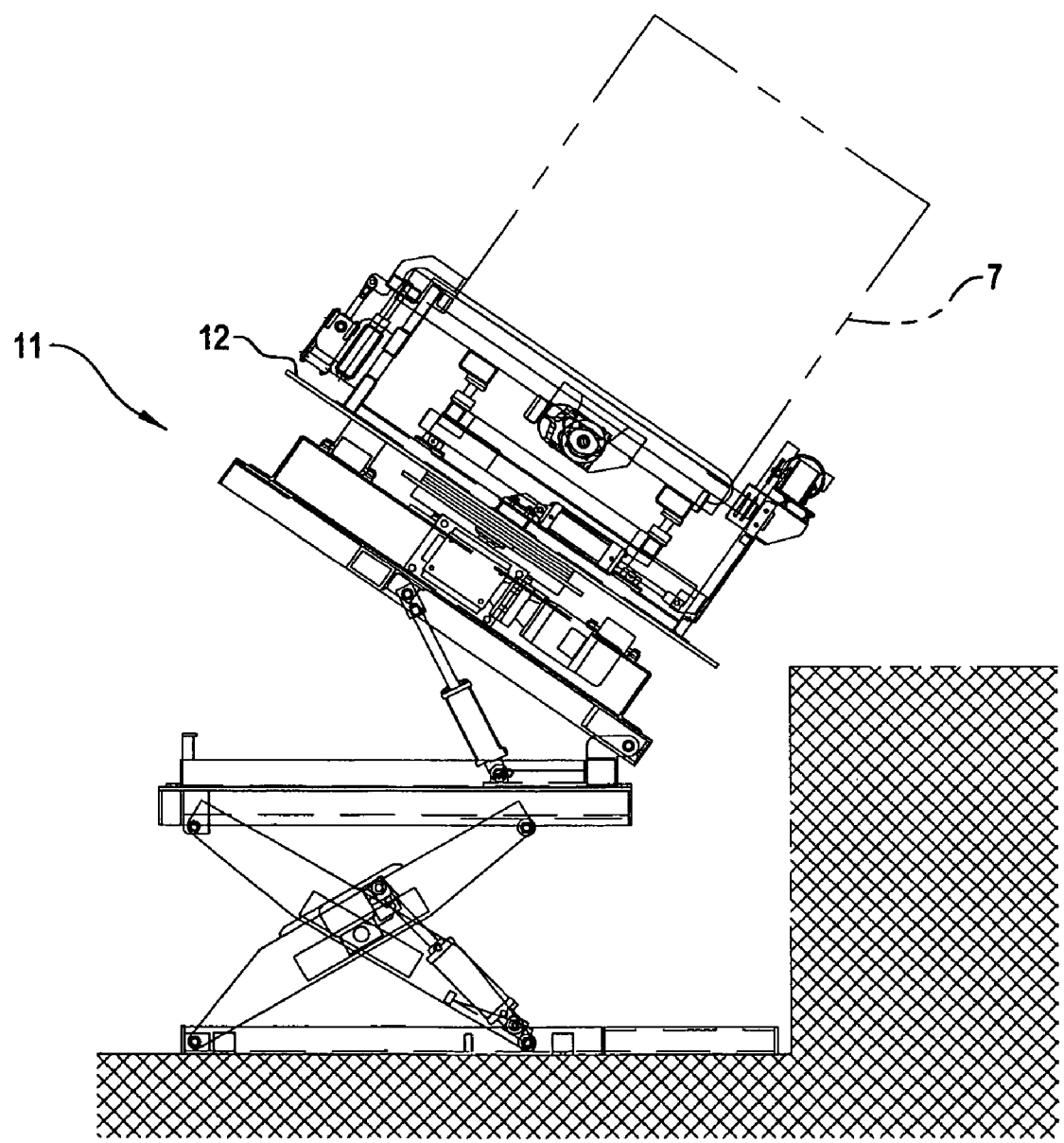
FIG. 4 illustrates a hydraulic lift and tilt apparatus which holds the coating basket during the introduction of uncoated workpieces into the coating basket.
Figure 5A:
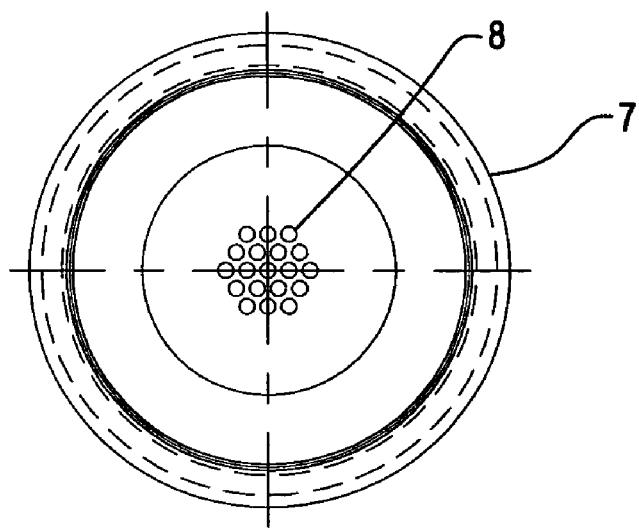
FIGS. 5A and 5B illustrate a plan view and a front view of a coating basket used in the present invention.
Figure 5B:
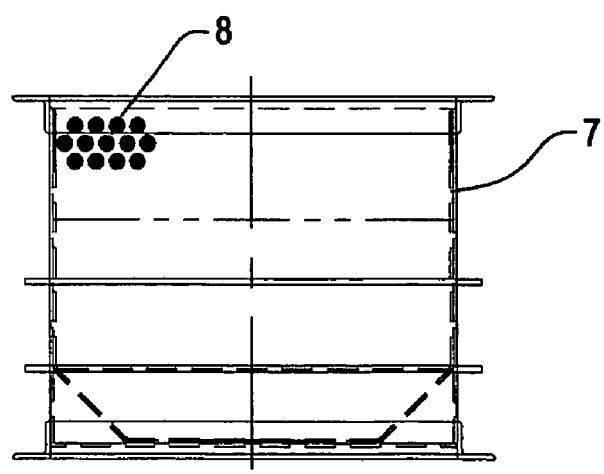

As shown in FIG. 4, the porous coating basket 7 and the pallet 10 are locked into a hydraulic lift and tilt mechanism 11 prior to the introduction of the workpieces 8 therein from the bin loader 2. The hydraulic lift and tilt mechanism is provided below floor level and supports the porous coating basket 7 at approximately floor level during the loading of the workpieces therein. A load cell can be used to monitor the weight of the workpieces 8 introduced into the porous coating basket 7. The hydraulic lift and tilt mechanism can tilt the porous coating basket 7 to a desired angle to aid in the introduction of the workpieces therein. Additionally, the hydraulic lift and tilt mechanism 11 comprises a powered turntable 12 which can rotate the porous coating basket 7 in a desired direction to help insure that the workpieces are evenly distributed therein. The rotational speed of the powered turntable 12 can be varied depending on the properties of the workpieces 8.

Figure 3A:
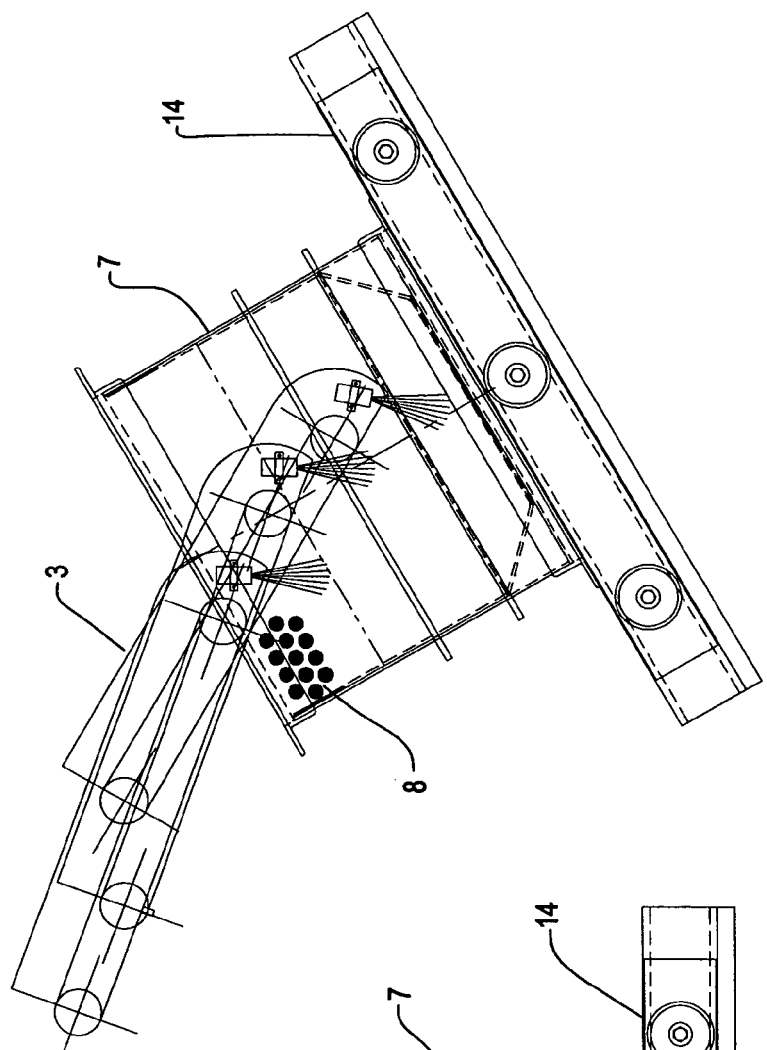
FIGS. 3A and 3B illustrate a telescoping conveyor feeding workpieces into a basket in a normal and tilt mode.
Figure 3B:
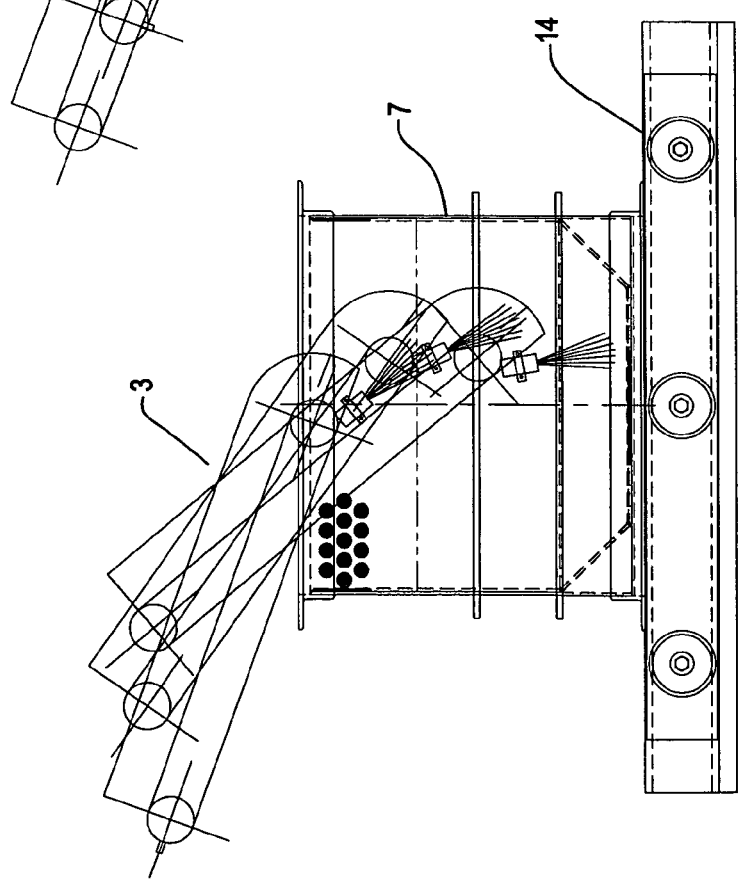

As shown in FIGS. 3A and 3B, a telescoping conveyor feeder 3 can be used to introduce the workpieces directly into the porous coating basket 7, if the workpieces are of such a nature that introducing them directly into the porous coating basket from the bin loader 2 would damage them. After the workpieces 8 are loaded into the porous coating basket 7, the hydraulic lift and tilt mechanism 11 raises the loaded coating basket and the pallet to the level of a first conveyor 13 and a chain conveyor 14 provided on the hydraulic lift and tilt mechanism transfers the loaded coated basket and the pallet onto the first conveyor 13.

The first conveyor 13 is preferably a chain conveyor and carries the pallet 10 having the porous coating basket 7 containing the workpieces 8 therein through a first side 15 of a dip-spin coating chamber 5. Upon reaching a predetermined position in the dip-spin coating chamber 5, a coating basket cover 16 locks onto the porous coating basket 7 containing the uncoated workpieces 8. The coating basket cover 16 is connected to a drive unit 17 for rotating and tilting the coating basket and supports the porous coating basket 7 as the pallet 10 is transferred by a second conveyor 22 out of the coating chamber 5 through a second side thereof 24 which is different from the first side 15 of the coating compartment. The second conveyor 22 is a bi-directional conveyor and can transfer the pallet 10 to and from the dip-spin coating chamber 5.

Figure 2:
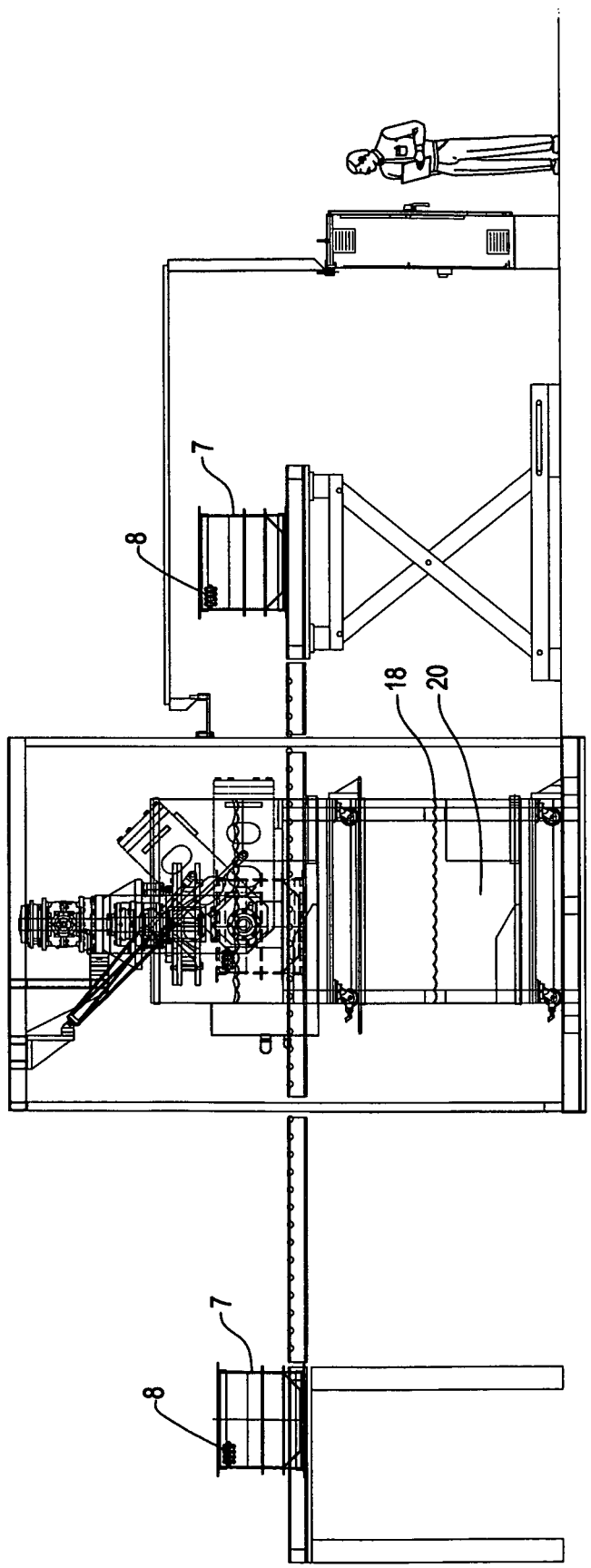
FIG. 2 is a side view of a dip-spin coating system of the present invention.
Figure 6:
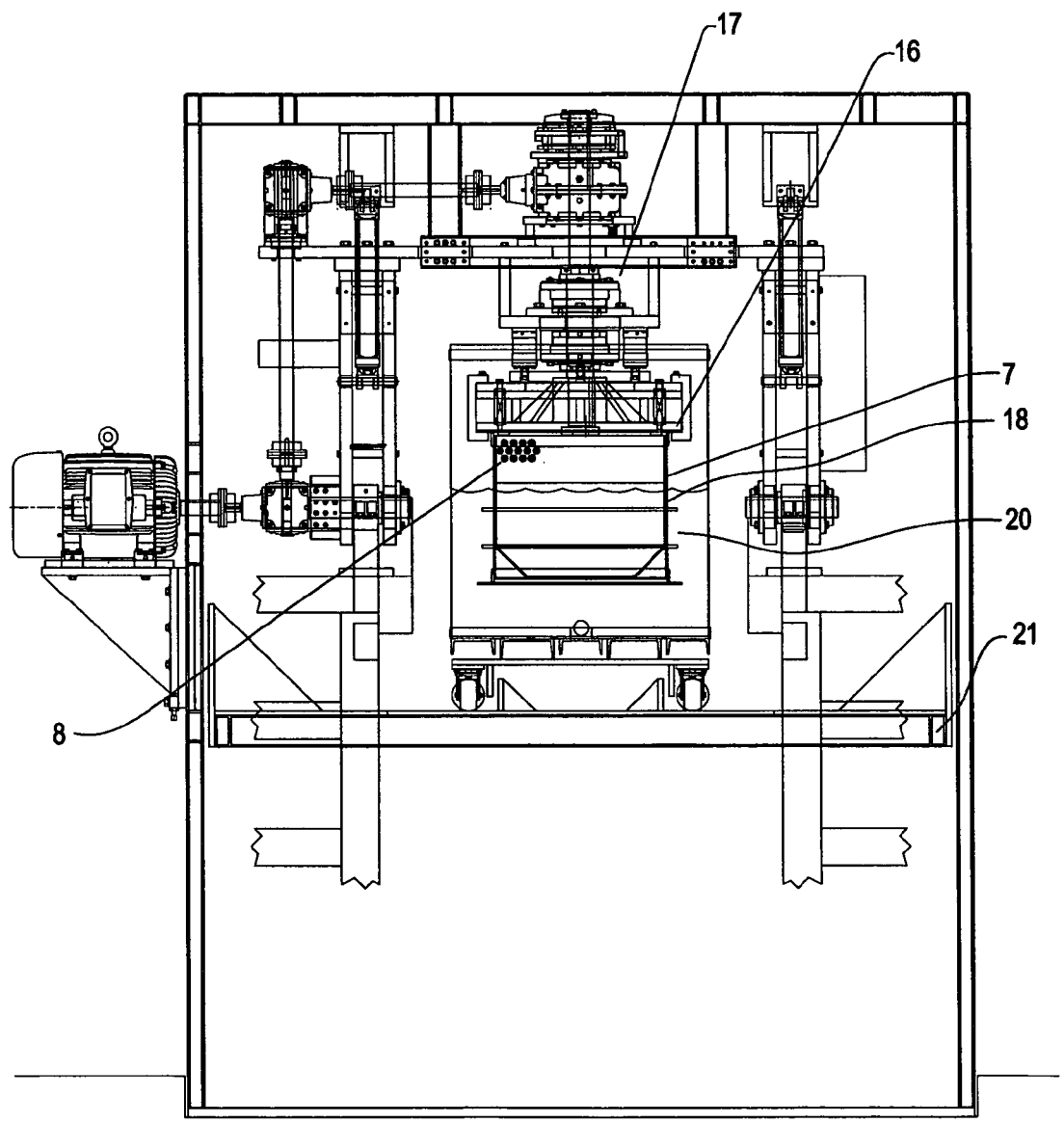
FIG. 6 is a rear view of the dip-spin coating chamber.

As shown in FIGS. 2 and 6, a coating tank 18 containing a coating solution 20 is positioned below the porous coating basket 7 containing the workpieces 8 in the dip-spin coating chamber 5. A coating tank lift 21 raises the coating tank 18 to a height where the coating solution 20 is brought into contact with the workpieces 8 in the porous coating basket 7. The coating solution 20 can be solvent- or water-based and comprise corrosion resistant, lubricant or adhesive compositions. The workpieces 8 are immersed in the coating solution 20 for a predetermined period of time sufficient to apply a desired coating onto the workpiece 8.

When the predetermined immersion time of the workpieces 8 in the coating solution 20 has elapsed, the coating tank 18 is lowered to a position where the workpieces 8 in the porous coating basket 7 are no longer contained in the coating solution 20 but at least a part of the porous coating basket 7 is still positioned within the coating tank 18. The drive unit 17 for rotating and tilting the coating basket is capable of supporting the coating basket in a vertical position or an inclined position as shown in FIGS. 2 and 6. A spin cycle is then initiated in which the porous coating basket is rotated at a sufficient speed to remove excess coating solution from the workpieces 8 by centrifugal force. The excess coating solution exits the porous coating basket 7 and impinges against the walls of the coating tank 18 and drains back into the coating solution 20 contained in the coating tank.

The drive unit 17 for rotating and tilting the coating basket can position the coating basket 7 in the coating tank 18 at up to a 45° angular tilt in the coating solution and can rotate the basket at a speed of from 0-20 RPM in the coating. The work basket then can shift back to the vertical position and accelerate up to 425 RPM. 275-425 RPM is the preferred range. After all of the excess coating solution has been removed from the workpieces 8, the coating tank 18 is lowered further so that the porous coating basket 7 is no longer contained therein and the second conveyor 22 then brings the pallet 10 back into the coating chamber 5 through the second side 24 thereof.

In the dip-spin coating chamber 5, the porous coating basket 7 containing the coated workpieces 8 is then placed on the pallet 10 and the coating basket cover 16 removed therefrom. The second conveyor 22 then transports the coating basket 7 containing the coated workpieces 8 through the second side 24 of the coating chamber 5 to a third conveyor 23. Air bladders (not shown) support the second conveyor 22 over the third conveyor 23. When the loaded basket 7 reaches a desired position over the third conveyor 23, the air bladder deflates so that the height of the second conveyor 22 becomes lower than that of the third conveyor 23 and the loaded coated basket 7 provided on the pallet 10 is now supported by the third conveyor 23.

Figure 7B:
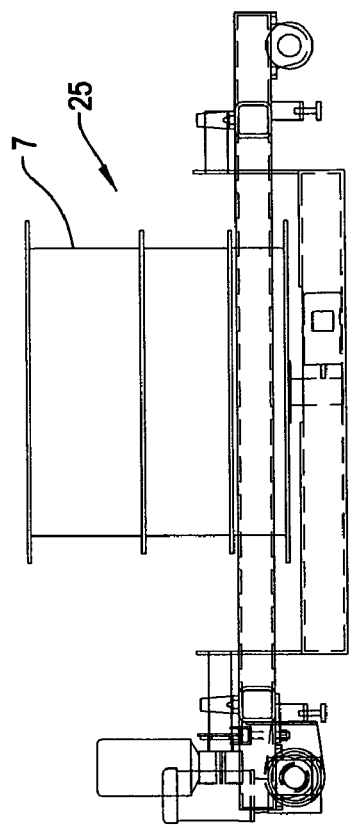
FIGS. 7A and 7B are front and end elevations of a basket unloader used in the present invention.
Figure 7A:
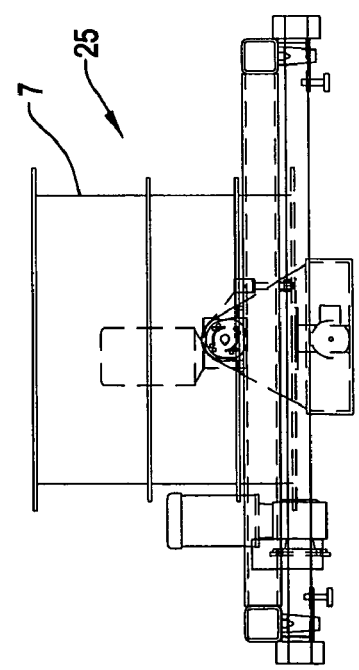

The third conveyor 23 in the illustrated embodiment of FIG. 1 comprises powered bi-directional rollers which are capable of rotating in two different directions. The third conveyor 23 transports the pallet 10 with the loaded porous coating basket 7 containing the coated workpieces 8 to a basket unloading station 6. There the loaded coated basket 7 is removed from the pallet 10 and, as shown in FIGS. 1 and 7, placed in a basket unloader 25 and locked therein. The basket unloader 25 is capable of pivoting the loaded coating basket 7 through an angle of 180° while rotating the coating basket in order to aid in the discharge of the coated workpieces therefrom. After the coated workpieces 8 have been discharged from the porous coating basket 7, the basket unloader 25 is unlocked to allow the empty porous coating basket 7 to be removed therefrom and repositioned on the pallet 10 provided on the third conveyor 23.

The third conveyor 23 then transports the pallet 10 and the empty porous coating basket 7 to a location where a fourth conveyor 26 is provided. The fourth conveyor 26, like the second conveyor 22, is supported by air bladders (not shown) which are inflated and deflated to raise and lower the fourth conveyor 26. Once the pallet 10 and the empty porous coating basket 7 are positioned above the fourth conveyor 26, the air bladder is inflated to raise the height of the fourth conveyor 26 above that of the third conveyor 23 so that the pallet 10 and the empty porous coating basket 7 are supported thereon. The fourth conveyor 26 is preferably a chain conveyor.

The fourth conveyor 26 transports the pallet 10 and the empty porous coating basket 7 to a fifth conveyor 27 which carries the empty porous coating basket 7 and the pallet 10 to an empty coating basket loading/unloading station 28. The fifth conveyor 27 is shown as being powered rollers in FIG. 1 and, if desired, an optional in-line basket cleaning station comprising spray nozzles and a cleaning solution can be provided over the fifth conveyor.

At the empty coating basket loading/unloading station 28, a sixth conveyor 30 is provided to receive the empty porous coating basket 7 and the pallet 10 from the fifth conveyor 27. The sixth conveyor 30 is also supported by an air bladder (not shown) which is deflated and inflated to lower and raise the sixth conveyor 30. As shown in FIG. 2, the sixth conveyor 30 is provided on a scissor lifting and lowering device 29 which can be lowered and raised to allow the removal and replacement of the empty porous coating basket 7 and/or the pallet 10 therefrom. When the air bladder is inflated, the height of the sixth conveyor 30 is above that of a seventh conveyor 31 and the sixth conveyor 30 receives the pallet 10 and the empty porous coating basket 7 from the fifth conveyor 27. Upon the pallet 10 and the empty porous coating basket 7 reaching a desired position over the seventh conveyor 31, the air bladder supporting the sixth conveyor 30 is deflated bringing the pallet 10 and the empty porous coating basket 7 into contact with the seventh conveyor 31.

As shown in FIG. 1, the seventh conveyor 31 can be powered rollers which are used to convey the pallet 10 and the empty porous coating basket 7 to a location where the pallet 10 and the empty porous coating basket 7 are provided on the hydraulic lift and tilt mechanism 11, where they are then locked into place and ready to receive uncoated workpieces 8 from the bin loader 2 and/or telescoping conveyor feeder 3 and be introduced into the dip-spin coating compartment 5.

While the invention has been described above with a specific example, the present invention is not limited thereby and various changes and modifications may be apparent to those of ordinary skill in the art. Since changes and modifications are to be understood as being included within the scope of the present invention as defined by the impending claims, unless they department therefrom.

What is claimed is:

1. A continuous process for coating a workpiece comprising the steps of:

introducing the workpiece into a mouth of a porous coating basket;

moving the porous coating basket containing the workpiece through a first side of a coating chamber;

sealing the mouth of the porous coating basket with a lid connected to a means for rotating the porous coating basket about its axis;

introducing the porous coating basket into a coating tank containing a coating solution such that the workpiece contained in the porous coating basket is immersed in the coating solution;

allowing the workpiece to remain immersed in the coating solution for a period of time sufficient to form a desired coating thereon;

effecting relative movement between the porous coating basket and the coating to a relative position where the workpiece is no longer contained in the coating solution and at least a portion of the porous coating basket is contained within the coating tank;

effecting rotational movement of the porous coating basket to cause excess coating solution to disengage from the workpiece and enter into the coating tank;

stopping the rotational movement of the porous coating basket and effecting relative movement between the porous coating basket and the coating tank to a relative position where the porous coating basket is no longer contained in the coating tank;

moving the porous coating basket containing the coated workpiece through a second side of the coating chamber different from the first side to a basket unloading station; and removing the coated workpiece from the porous coating basket at the basket unloading station, wherein the porous coating basket is inclined while rotational movement thereof is effected to cause disengagement of the excess coating liquid from the workpiece.

2. The method of claim 1, wherein the porous coating basket is rotating about its axis when the workpiece is introduced therein.

3. The method of claim 1, wherein the porous coating basket is inclined when the workpiece is introduced therein.

4. The method of claim 1, wherein a telescoping conveyor extends into the porous coating basket to deliver the workpiece therein.

5. The method of claim 1, wherein the coating tank is raised to introduce the workpiece into the coating solution.

6. The method of claim 1, wherein the coating tank is lowered to the relative position where the workpiece is no longer contained in the coating solution.

7. The method of claim 1, wherein the coating tank is lowered to the relative position where the porous coating basket is no longer contained in the coating tank.

8. The method of claim 1, wherein the porous coating basket is supported on a pallet when the workpiece is introduced therein.

9. The method of claim 8, wherein the porous coating basket containing the workpiece is separated from the pallet at the coating station prior to the introduction of the porous coating basket into the coating tank.

10. The method of claim 9, wherein the porous coating basket is reunited with the pallet at the coating station after the porous coating basket is at the relative position where it is no longer contained in the coating tank.

11. The method of claim 8, wherein the porous coating basket is separated from the pallet at the basket unloading station.

12. The method of claim 1, wherein the porous coating basket is rotated during the removal of the coated workpiece.

13. The method of claim 1, wherein the second side of the coating chamber is opposite to the first side.

* * * * *